United States Patent [19]

Herb et al.

[11] 4,141,528
[45] Feb. 27, 1979

[54] SOUND DAMPENING FASTENING ELEMENT

[75] Inventors: Armin Herb, Peissenberg; Raimer Uhlig, Munich, both of Fed. Rep. of Germany

[73] Assignee: Hilti Aktiengesellschaft, Schaan, Liechtenstein

[21] Appl. No.: 869,260

[22] Filed: Jan. 13, 1978

[30] Foreign Application Priority Data

Jan. 24, 1977 [DE] Fed. Rep. of Germany ....... 2702765

[51] Int. Cl.² ............................................. F16F 9/10
[52] U.S. Cl. .................................. 248/560; 267/141
[58] Field of Search ............. 248/18, 20, 358 R, 54 R, 248/60; 269/140, 141, 152

[56] References Cited

U.S. PATENT DOCUMENTS

| | | | |
|---|---|---|---|
| 1,720,545 | 7/1929 | Aickey | 248/358 R X |
| 1,850,289 | 3/1932 | Saurer | 248/358 R X |
| 2,156,301 | 5/1939 | Loeinus | 248/358 R |
| 2,216,814 | 10/1940 | Gray | 248/358 R UX |
| 2,226,505 | 12/1940 | Saurer | 248/358 R X |

FOREIGN PATENT DOCUMENTS 2025904 12/1971 Fed. Rep. of Germany ...... 248/358 R
1371248 10/1974 United Kingdom .................... 267/152

*Primary Examiner*—J. Franklin Foss
*Attorney, Agent, or Firm*—Toren, McGeady and Stanger

[57] ABSTRACT

A sound dampening fastening element includes a sound dampening body, an anchoring member and a support member. The dampening body is prism-shaped and formed of a resilient material. The anchoring member has a head and a shank with the head and a portion of the shank embedded within the dampening body and the remaining portion of the shank extending outwardly from the dampening body. The support member is partly embedded within the dampening body and the remaining part extends outwardly from the opposite side of the dampening body from which the shank extends. The support member has a shaped configuration with wall sections within the dampening body combining to form an opening through which the shank extends. The diameter of the opening is greater than the diameter of the shank but smaller than the diameter of the head of the anchoring member. The part of the support member extending outwardly from the dampening body includes openings for receiving a belt-like support element and also a threaded opening.

10 Claims, 5 Drawing Figures

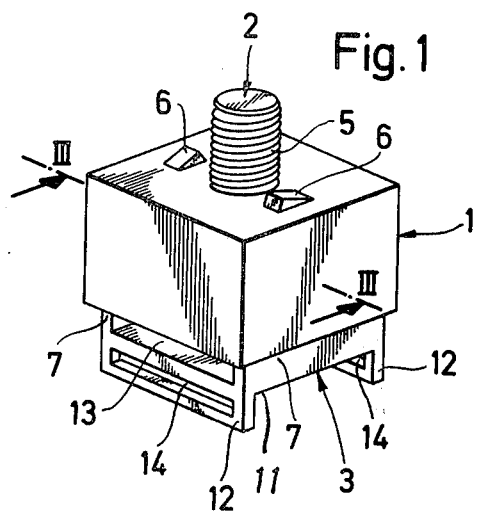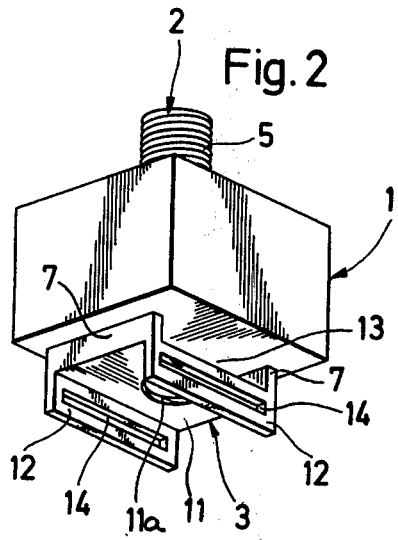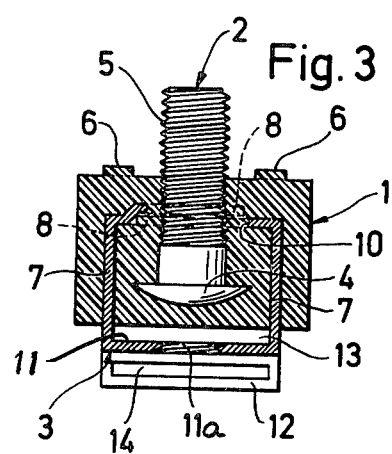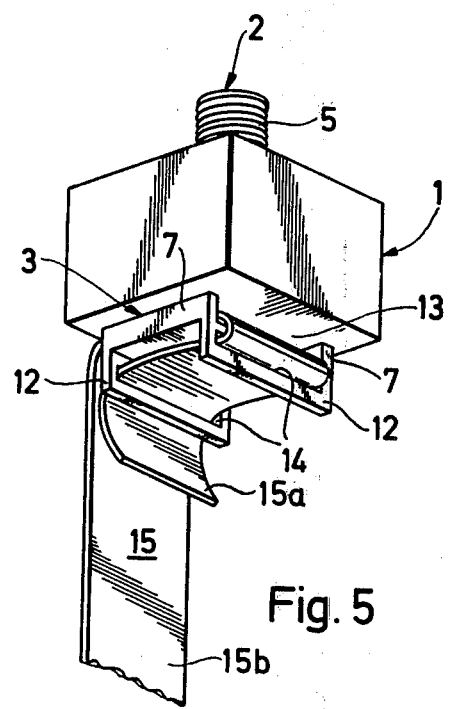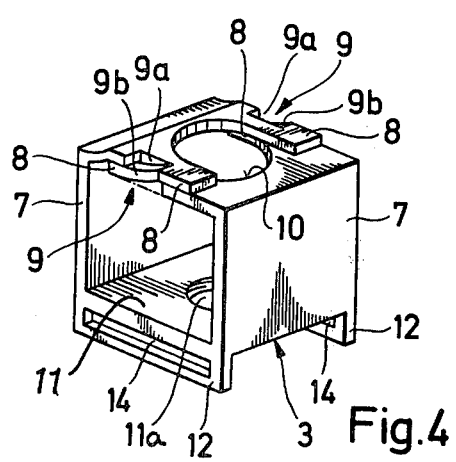

SOUND DAMPENING FASTENING ELEMENT

SUMMARY OF THE INVENTION

The present invention is directed to a sound dampening fastening element including a sound dampening body, with an anchoring member and a support member each partly embedded in the dampening body. Further, within the dampening body the support member is located about the anchoring member and outwardly from the dampening body the support member has openings for receiving a supporting element.

Fastening elements of this type are used to suspend pipes, cable ducts, ventilating shafts, and other devices while providing a sound dampening effect. Such fastening elements must be capable of providing support in all types of locations. For example, the fastening element can be attached directly to an object to be suspended and to a supporting structure, such as a ceiling or wall. Further, it must be possible to locate the fastening element intermediate the object to be supported and the structure to which the element is secured. Accordingly, the fastening element must be capable of attachment to the object to be supported in a number of different ways, such as by threaded rods, screws, sleeves, belt-like material, wire and various other connecting members. Moreover, an important feature of the fastening element is that it continues to provide the supporting effect in the event of a fire and destruction of the dampening body.

A known fastening element which continues to provide a supporting effect even when exposed to fire, includes a cup-shaped member with the dampening body positioned within the member. A threaded bore in the bottom of the cup-shaped member provides one type of connection while an anchoring bolt projecting from the member and embedded in the dampening body affords another type of connection. These two types of connection involve either a male or female thread. As a result, the fastening element is significantly restricted in use, since an object to be supported must be attached to the fastening element by either a male or female thread. Furthermore, the cup-shaped member is formed of metal and completely encloses the dampening body so that an additional dampening body is needed on one of the end surfaces of the member to prevent the formation of a metal bridge. Such fastening elements are very complicated in design.

The primary object of the present invention is to afford a simple sound dampening fastening element to which an object to be supported can be connected in a great number of ways.

In accordance with the present invention, the fastening element includes a support member partially embedded within the sound dampening body. The support member includes a C-shaped part and another part with overlapping end sections.

The fastening element embodying the present invention is of an extremely simple design. The support member of the element is formed of a sheet material and has a C-shaped part from which objects to be supported can be suspended.

A portion of the support member is embedded in the sound dampening body. The dampening body is preferably formed of a resilient material, such as rubber. Portions of the support member are disposed in overlapping engagement. An anchoring member is also embedded in the dampening body and includes a shank with a head at one end arranged to carry the support member.

Within the fastening element, the part of the anchoring member located in the dampening body extends through an opening formed by the overlapping portions of the support member. The opening is provided by recesses in the overlapping wall portions and the recesses are shaped so that they do not contact the anchoring member. Within the dampening body a clearance is provided between the support member and the anchoring member.

Though the assembled fastening element provides a clearance between the support member and the anchoring member, in the event of a fire where the dampening body is completely destroyed, the head of the anchoring member is arranged to provide a bearing surface for the support member. Accordingly, if the dampening body is completely destroyed, the support member will rest on the head of the anchoring member maintaining a supporting connection for the object originally carried by the dampening body.

To improve load carrying capacity of the fastening element and to prevent any slippage between the walls of the support member and the dampening body, the ends of the walls of the support member include locking means so that they can be interlocked with one another. These locking means may consist of depressions, recesses or cut outs in the end of one wall and pins, studs or projections in the end of the other wall so that the ends interlock with one another. It would also be possible to interconnect the ends by welding or other suitable methods.

To improve the variety of connection means which can be used with the fastening element, the support member, in addition to a threaded receiving opening, includes one or more lugs with corresponding openings through which wire, belt-like material or shaped connectors can be passed.

Preferably, the openings in the lugs have an elongated shape perpendicular to the direction of suspension from the fastening element. This elongated shape is especially helpful when a belt-like material is used for suspending an object. Furthermore, a passageway can be provided between a surface on the dampening body and a wall of the support member spaced outwardly from the dampening body through which a belt-like material can be passed so that a loop of the material can, without any additional attachment means, be self-supported from the fastening element.

In addition to affording optimum sound dampening, the fastening element according to the present invention, affords a very broad range of possibilities for supporting objects due to its design, especially because of the slots formed in the support member and the passageway provided between the dampening body and the support member which permit the use of belt-like material and the like for supporting objects. These supporting features are, of course, in addition to the threaded receiving opening formed in the support member. Accordingly, wire, belt-like material, shaped connectors and the like can be directly attached to the support member in the same simple manner as parts with male and female threads. Therefore, the fastening element can be attached directly to a ceiling or wall and to an object to be suspended or, optionally, it can be located intermediate to the supporting structure and the object to be supported.

To prevent the fastening element from being loosened from a supporting structure, locking means are provided on the surface of the dampening body from which the anchoring member projects. The locking means can be provided by pins, projections or the like extending from the surface of the fastening element which contacts the supporting structure. These locking means may be formed directly from the material of the dampening body or separate means may be incorporated into the dampening body. The arrangement of such locking means is especially advantageous because of the vibrations which frequently develop in the use of the fastening elements embodying the present invention.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the Drawing:

FIG. 1 is a perspective showing of a fastening element embodying the present invention;

FIG. 2 is another perspective view of the fastening element shown in FIG. 1;

FIG. 3 is a view, partly in section, taken along the line III—III in FIG. 1;

FIG. 4 is a perspective view of the support member of the fastening element shown in FIG. 1; and FIG. 5 is another perspective view of the fastening element illustrated in FIG. 1, with a loop of belt-like material for securing an object to the support member.

DETAILED DESCRIPTION OF THE INVENTION

FIGS. 1-3 and 5 show the fastening element consisting of a sound dampening body 1, an anchoring screw or bolt 2 and a support member 3. As shown best in FIG. 3, the anchoring bolt 2 includes a head 4 at one end with a threaded shank projecting from the head. The head 4 is embedded in the dampening body 1 which has the shape of a prism or, more specifically, it has a six-sided box-like shape. Preferably, the dampening body 1 is formed of a resilient rubber-like material, for example, it may be formed of rubber or of a correspondingly resilient plastics material. A portion of the threaded shank 5 extending from the head is embedded in the dampening body 1 and its opposite end from the head 4 projects from one of the planar surfaces of the prism-shaped dampening body. The surface from which the shank projects is the surface which normally bears against the surface of a supporting structure. To prevent the fastening element from becoming loosened once it is secured to a supporting structure, locking means are provided on the surface of the dampening body 1 from which the shank 5 of the anchoring bolt 2 projects. As shown in FIG. 1, the locking means are wedge-shaped projections 6 formed on the surface of the dampening body 1, however, other types of locking means can be used formed either directly from the material of the dampening body or incorporated into it.

As illustrated in FIG. 3, a portion of the support member 3 is located within the dampening body 1 while a C-shaped portion projects outwardly from the body. Support member 3 has a pair of laterally spaced side walls 7 including angularly extending wall ends 8 projecting toward one another. The wall ends 8 are embedded within the dampening body as is a major portion of the side walls 7. Additional details of the support member 3 can be noted in FIG. 4. FIG. 4 illustrates how the wall ends 8 overlap one another. Interengaging or locking means 9 are provided in the wall ends 8. These interengaging means 9 include recess 9a formed in one of the wall ends while the other wall end has projections 9b which fit into and interlock with the recesses. Furthermore, the portions of the wall ends 8 directed toward one another each have a recess 10. These recesses 10 combine in the assembled position to form an opening through which the shank 5 of the anchoring bolt 2 passes so that a clearance is provided between the surfaces of the recesses and the shank, in other words, there is no contact between the wall ends 8 and the shank 5 of the anchoring bolt 2.

The portion of the support member 3 extending outwardly from the dampening body 1 and having a C-shape includes an interconnecting wall 11 extending between the ends of the side walls 7. Centered in the interconnecting wall 11 is a threaded opening 11a into which a connecting member can be threaded. Forming the opposite sides of the C-shaped portion of the support member 3 are lugs 12 which, as shown, extend downwardly from the interconnecting wall 11, that is, they extend outwardly away from the dampening body 1. Note the arrangement of the lugs 12 as shown in FIGS. 1-3. Since the interconnecting wall 11 is spaced outwardly from the adjacent planar face of the dampening body 1 it forms a slot-like passageway 13 therebetween. Each of the lugs 12 has a slot-like opening 14 through which a belt-like connecting material or other type of connector can be passed for suspending an object from the fastening element. The openings 14 are elongated in the direction perpendicular to the axis of the anchoring bolt 2.

In FIG. 5 an example is shown of a belt-like material 15 in self-locking engagement with the support member 3. To provide this attachment, the belt-like material is passed through the slot-like passageway 13 and through the openings 14 in the lugs 12 of the support member. When a load is applied to the material 15, friction will develop between its free end 15a and the opposite end 15b to which the load is applied. The extent of the friction force developed will be such that self-locking will occur. If the applied load increases, the friction force will also increase.

It should be understood that the attachment of the belt-like material 15 shown in FIG. 5 is provided only by way of example. It is possible to secure the belt-like material to the support member in different ways. For example, the belt-like material could be passed through only one or both of the openings 14 or only through the slot-like passageway 13. The use of the belt-like material affords only one example of a variety of connection means which can be used in combination with the support member. If a shaped connector is attached to the support member in the slot-like passageway 13 or in the openings 14 and does not occupy the full width of the passageway or the openings, the remaining play can be used to compensate for expansion.

While specific embodiments of the invention have been shown and described in detail to illustrate the application of the inventive principles, it will be understood that the invention may be embodied otherwise without departing from such principles.

What is claimed is:

1. Sound dampening fastening element comprising a sound dampening body, an anchoring member embedded in said dampening body, and a support member located within and extending outwardly from said dampening body, said support member including a threaded opening for receiving a threaded member, wherein the improvement comprises that said support member includes a pair of first walls, said first walls each comprising a first wall section located on an opposite side of said anchoring member from the other said first wall section, and a second wall section extending from each said first wall section and disposed in overlapping engagement with the other said second wall section, said second wall sections being located within said dampening body, said second wall sections being shaped so that one of said second wall sections interlocks into the other said second wall sections, and one of said second wall sections has at least one first recess formed therein and the other one of said second wall sections has a complementary shaped projection thereon arranged to fit in interlocking engagement with the first recess in the one of said second wall sections.

2. Sound dampening fastening element comprising a sound dampening body, an anchoring member embedded in said dampening body, and a support member located within and extending outwardly from said dampening body, said support member including a threaded opening for receiving a threaded member, wherein the improvement comprises that said support member includes a pair of first walls, said first walls each comprising a first wall section located on an opposite side of said anchoring member from said other first wall section, a second wall section extending from each said first wall section and disposed in overlapping engagement with the other said second wall section, said second wall section being located within said dampening body, said support member includes a C-shaped part located outwardly from said dampening body, and said C-shaped part of said support member includes a pair of spaced lugs extending outwardly away from said dampening body, said lugs each having an opening therethrough so that a connecting element can be passed through the openings for supporting an object from said support member.

3. Sound dampening fastening element comprising a sound dampening body, an anchoring member embedded in said dampening body, and a support member located within and extending outwardly from said dampening body, said support member including a threaded opening for receiving a threaded member, wherein the improvement comprises that said support member includes a pair of first walls, said first walls each comprising a first wall section located on an opposite side of said anchoring member from the other said first wall section, a second wall section extending from each said first wall section and disposed in overlapping engagement with the other said second wall section, said second wall sections being located within said dampening body, said support member includes a C-shaped part located outwardly from said sound dampening body, and said C-shaped part includes a second wall secured to and interconnecting each of said first wall sections at a location spaced from said second wall sections, a portion of each of said wall sections being embedded within said dampening body, and said second wall being located outwardly from said dampening body and forming, in combination with said first wall sections and the adjacent surface of said dampening body, a passageway through which a connecting element can be passed so that in turn the connecting element can be used to support another object from said sound dampening fastening element.

4. Sound dampening fastening element, as set forth in claim 3, wherein said support member disposed within said dampening body being arranged in spaced relation with said anchoring member so that there is no surface contact between said support member and said anchoring member.

5. Sound dampening fastening element, as set forth in claim 3, wherein said sound dampening body has a prismatic shape with a planar face adjacent to and spaced from said second wall for forming the passageway therebetween.

6. Sound dampening fastening element, as set forth in claim 4, wherein said sound dampening body is prism-shaped having a first planar face facing in one direction and a second planar face facing in the opposite direction, said anchoring member comprising a bolt having an elongated shank and a head formed on and extending laterally outwardly from one end of said shank, said head embedded within said dampening body and a portion of said shank extending from said head embedded within said dampening body with the remaining portion of said shank extending outwardly from said first face of said dampening body, said second wall sections extending transversely from said first wall sections and located wholly within said dampening body, each of said second sections has a second recess and said second recesses combining to form an opening laterally enclosing said shank and spaced outwardly from said shank and spaced in the axial direction of said shank from said head, each said first wall sections located partly within said dampening body with the remaining portion thereof extending outwardly from said second planar face, said support member including a C-shaped part located outwardly from said second planar face of said dampening body and including a second wall secured to and interconnecting said first wall sections, said second wall spaced from the adjacent said second planar face of said dampening body and forming with said second planar face and the portions of said first wall sections extending outwardly from said dampening body a passageway through which a connecting member can be fitted, and said C-shaped part including a pair of spaced lugs extending from a pair of opposite sides of said second wall away from said dampening body and each of said lugs having an opening therethrough so that a connecting element can be passed through the opening.

7. Sound dampening fastening element, as set forth in claim 6, wherein a pair of projections are formed on and extend outwardly from said first planar face of said dampening body, said projections being located on and spaced outwardly from the opposite sides of said anchoring member.

8. Sound dampening fastening element, as set forth in claim 7, wherein said projections are wedge-shaped.

9. Sound dampening fastening element, as set forth in claim 6, wherein said sound dampening body is formed of a resilient rubber-like material.

10. Sound dampening fastening element, as set forth in claim 6, wherein said second wall having a threaded opening therein for receiving a threaded connecting element.

* * * * *